(12) United States Patent
Adireddy et al.

(10) Patent No.: US 6,912,250 B1
(45) Date of Patent: Jun. 28, 2005

(54) SYSTEM AND METHODS FOR PRECURSOR CANCELLATION OF INTERSYMBOL INTERFERENCE IN A RECEIVER

(75) Inventors: Srihari Adireddy, Ithaca, NY (US); Lang Tong, Ithaca, NY (US)

(73) Assignee: Cornell Research Foundation Inc., Ithaca, NY (US)

( * ) Notice: Subject to any disclaimer, the term of this patent is extended or adjusted under 35 U.S.C. 154(b) by 779 days.

(21) Appl. No.: 09/627,237

(22) Filed: Jul. 27, 2000

Related U.S. Application Data

(60) Provisional application No. 60/165,321, filed on Nov. 12, 1999.

(51) Int. Cl.[7] ............................ H03H 7/30; H03H 7/40; H03K 5/159
(52) U.S. Cl. ...................... 375/232; 375/231; 375/233; 375/348; 375/346; 375/347
(58) Field of Search ................................. 375/219, 233, 375/348, 231, 346, 347, 232; 360/65; 333/18; 370/286, 232

(56) References Cited

U.S. PATENT DOCUMENTS

| | | | | |
|---|---|---|---|---|
| 4,468,786 A | * | 8/1984 | Davis ........................ 375/229 |
| 4,730,259 A | | 3/1988 | Gallant ........................ 364/513 |
| 4,953,183 A | * | 8/1990 | Bergmans et al. .......... 375/348 |
| 4,959,870 A | | 9/1990 | Tachikawa ................... 382/56 |
| 5,005,206 A | | 4/1991 | Naillon et al. ............... 382/56 |
| 5,161,204 A | | 11/1992 | Hutcheson et al. .......... 382/16 |
| 5,181,198 A | * | 1/1993 | Lechleider .................. 370/286 |
| 5,239,594 A | | 8/1993 | Yoda ........................ 382/15 |
| 5,263,097 A | | 11/1993 | Katz et al. ................... 382/48 |
| 5,274,714 A | | 12/1993 | Hutcheson et al. .......... 382/15 |
| 5,287,275 A | | 2/1994 | Kimura .................. 364/419.01 |
| 5,313,534 A | | 5/1994 | Burel ........................ 382/56 |
| 5,317,507 A | | 5/1994 | Gallant .................. 364/419.13 |
| 5,325,298 A | | 6/1994 | Gallant .................. 364/419.19 |
| 5,465,308 A | | 11/1995 | Hutcheson et al. .......... 382/159 |
| 5,468,069 A | | 11/1995 | Prasanna et al. ............ 382/253 |
| 5,519,727 A | * | 5/1996 | Okanoue et al. ............ 375/232 |
| 5,579,471 A | | 11/1996 | Barber et al. ............... 395/326 |
| 5,596,659 A | | 1/1997 | Normile et al. ............. 382/253 |
| 5,598,428 A | * | 1/1997 | Sato .......................... 375/148 |
| 5,602,589 A | | 2/1997 | Vishwanath et al. ........ 348/398 |
| 5,619,709 A | | 4/1997 | Caid et al. .................. 395/794 |
| 5,647,058 A | | 7/1997 | Agrawal et al. ............ 395/601 |
| 5,748,674 A | * | 5/1998 | Lim .......................... 375/233 |
| 5,748,786 A | | 5/1998 | Zandi et al. ................ 382/240 |
| 5,822,143 A | * | 10/1998 | Cloke et al. .................. 360/65 |
| 5,923,226 A | * | 7/1999 | Kakura et al. ................ 333/18 |
| 6,031,866 A | * | 2/2000 | Oler et al. .................. 375/219 |
| 6,144,697 A | * | 11/2000 | Gelfand et al. ............. 375/233 |
| 6,314,147 B1 | * | 11/2001 | Liang et al. ................ 375/346 |
| 6,400,761 B1 | * | 6/2002 | Smee et al. ................ 375/232 |

FOREIGN PATENT DOCUMENTS

| | | |
|---|---|---|
| EP | 0571919 A1 | 12/1993 |
| EP | 0720334 A2 | 7/1996 |

OTHER PUBLICATIONS

Brown, P.F., et al., "A Statistical Approach to Machine Translation", Computational Linguistics, (Jun. 1990), vol. 16, No. 2, pp. 79–85.

(Continued)

*Primary Examiner*—Phuong Phu

(57) ABSTRACT

There is disclosed, for use in a receiver receiving from a transmission channel an incoming stream of known symbols and unknown symbols distorted by intersymbol interference (ISI), an apparatus for reducing a precursor ISI signal. The apparatus for reducing the precursor ISI signal comprises: 1) a decision feedback equalizer for receiving the incoming stream of distorted known symbols and distorted unknown symbols and generating a sequence of detected symbols; and 2) a known symbol generator for generating a copy of a first known symbol prior to an estimation of the first known symbol by the decision feedback equalizer, wherein the decision feedback equalizer uses the copy of the first known symbol to reduce a first precursor ISI signal in a second symbol transmitted prior to the first known symbol.

23 Claims, 5 Drawing Sheets

OTHER PUBLICATIONS

Crouch, C.J., "An Approach to the Automatic Construction of Global Thesauri," Information Processing & Management, (1990), vol. 26, No. 5, pp. 629–640.

Cutting, D.R., et al., "Scatter/Gather: A Cluster–based Approach to Browsing Large Document Collections," 15th Ann Int'l SIGIR, (1992), pp. 1–12.

Deerwester, et al., "Indexing by Latent Semantic Analysis," Journal of the American Society for Information Science, (1990) 41(6), pp. 391–407.

Dowe, J., "Content–based Retrieval in Multimedia Imaging," Proc. SPIE, vol. 1908, Apr. 1993, pp. 164–167.

Egghe, L., "A New Method for Information Retrieval, Based on the Theory of Relative Concentration," Proceedings of the 13th International Conference on Research and Development in Information Retrieval, (Sep. 5–7, 1990), pp. 469–493.

Evans, et al., "Automatic Indexing Using Selective NLP And First–Order Thesauri," Departments of Philosophy and Computer Science Laboratory for Computational Linguistics, Carnegie Mellon University, Pittsburgh, PA, pp. 624–639.

Gallant, S.I., "A Practical Approach for Representing Context and for Performing Word Sense Disambiguation Using Neural Networks," Neural Computation 3, (1991), pp. 293–309.

Grefenstette, G., "Use of Syntactic Context to Produce Term Association Lists for Text Retrieval," Computer Science Department, University of Pittsburgh, Pittsburgh, PA, (1992), pp. 89–97.

Kimoto, H., et al., "Construction of a Dynamic Thesaurus and Its Use for Associated Information Retrieval," Proceedings of the 13th International Conference on Research and Development in Information Retrieval, (Sep. 5–7, 1990), pp. 227–241.

Kwok, K.L., "A Neural Network for Probabilistic Information Retrieval," Proceedings of the Twelfth Annual International ACMSIGIR Conference on Research and Development in Information Retrieval, (Jun. 25–28, 1980), pp. 21–30.

Liddy, et al., "Statistically–Guided Word Sense Disambiguation," School of Information Studies, Syracuse University, Syracuse, New York, pp. 98–107.

Lin, X., et al., "A Self–Organizing Semantic Map for Information Retrieval", *Proceedings of the 14th International ACM/SIGIR Conference on Research and Development in Information Retrieval,* (1991), pp. 262–269.

McCune, et al., "Rubric: A System for Rule–Based Information Retrieval," IEEE Transactions on Software Engineering, (1985), vol. SE–11, No. 9, pp. 939–945.

Myamoto, et al., "Generation of a Pseudothesaurus for Information Retrieval Based on Co–occurrences and Fuzzy Set Operations." IEEE Transaction on Systems, Man, Cybernetics, (Jan./Feb. 1983), vol. SMC–13, No. 1., p. 62–70.

Niblack, W., "QBIC Project: Querying Images by Content, Using Color, Texture, and Shape," Proc. SPIE, vol. 1908, Apr. 1993, pp. 173–187.

Peat, et al., "The Limitations of Term Co–Occurrence Data for Query Expansion in Document Retrieval Systems," Journal of the American Society for Information Science, (1991), 42(5), pp. 378–383.

Qiu, et al., "Concept Based Query Expansion," Department of Computer Science, Swiss Federal Institute of Technology, Zurich, Switzerland, pp. 160–169.

Ruge, G., "Experiments on Linguistically–Based Term Associations," Information Processing & Management, (1992), vol. 28, No. 3, pp. 317–332.

Salton, G., et al., "A Vector Space Model For Automatic Indexing", *Comm. Of the ACS,* (Nov. 1975), vol. 18, No. 11, pp. 613–620.

Salton, G., et al., "Introduction to Modern Information Retrieval," McGraw–Hill Book Company, pp. 118–155.

Sekine, S., et al., "Automatic Learning for Semantic Collocation."

Schultze, H., "Dimensions of Meaning," Proceedings Supercomputing, (Nov. 16–20, 1992), pp. 787–796.

Sutcliffe, R.F.E., "Distributed Representations in a Text Based Information Retrieval System: a New Way of Using the Vector Space Model", *Proc. Of the ACM/SIGIR Conf.,* Chicago, IL, (Oct. 13–16, 1991), pp. 123–132.

Turtle, H., et al., "Inference Networks for Document Retrieval", Proceedings of the 13th International Conference on Research and Development in Information Retrieval, (Sep. 5–7, 1990), pp. 1–25.

Van Rijsbergen, C.J., "A Theoretical Basis For the Use of Co–Occurrence Data in Informational Retrieval", *J of Documentation,* (Jun. 1977), vol. 33, No. 2, pp. 106–119.

Voorhees, E.M., et al., "Vector Expansion in a Large Collection," Siemens Corporate Research, Inc., Princeton, New Jersey.

Wilks, Y., et al., "Providing Machine Tractable Dictionary Tools," Computer Research Laboratory, New Mexico State University, Las Cruces, New Mexico, pp. 98–154.

Wong, S.K.M., et al., "On Modelling of Information Retrieval Concepts in Vector Spaces," ACM Transactions on Database Systems, (Jun. 1987), vol. 12, No. 2, pp. 299–321.

* cited by examiner

SYSTEM AND METHODS FOR PRECURSOR CANCELLATION OF INTERSYMBOL INTERFERENCE IN A RECEIVER

This application claims priority under 35 U.S.C. §119(e) to U.S. Provisional Patent Application No. 60/165,321 entitled "Precursor Cancellation DFE" filed Nov. 12, 1999.

CROSS-REFERENCE TO RELATED APPLICATIONS

The present invention is related to those disclosed in the following United States Patent Applications:

1. Ser. No. 09/627,191, filed concurrently herewith, entitled "SYSTEMS AND METHODS FOR OPTIMAL SYMBOL SPACING TO MINIMIZE INTERSYMBOL INTERFERENCE IN A RECEIVER";
2. Ser. No. 09/627,453, filed concurrently herewith, entitled "DUAL EQUALIZER FOR USE IN A RECEIVER AND METHOD OF OPERATION"; and
3. Ser. No. 09/627,190, filed concurrently herewith, entitled "SYSTEMS AND METHODS FOR OPTIMAL DISTRIBUTION OF SYMBOLS IN A FIXED SIZE DATA PACKET TO IMPROVE RECEIVER PERFORMANCE".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless and wireline receivers and, more specifically, to a system and method for cancelling precursor intersymbol interference (ISI) in a receiver.

BACKGROUND OF THE INVENTION

The rapid advance of digital technology has created a great demand for, and corresponding advances in, wireless and wireline technology for communicating voice and data traffic. Much of this traffic is carried by the public switched telephone network over fiber optic cable and copper wire. Computers and other data equipment communicate over the Internet and a variety of proprietary local area networks (LANs) and wide area networks (WANs). Increasingly, various types of digital subscriber line (DSL) service or cable modem service are bringing broadband data into homes and offices. Many third generation cellular telephones and wireless PDA devices are also equipped to handle broadband data traffic and Internet capable.

However, even the most modern of wireless and wireline data communication equipment still must contend with the age-old problems inherent in transmitting data through a channel from a transmitter to a receiver. Data is often transmitted as a series of pulses (or symbols) through a wire or the atmosphere. The data symbols may become distorted due to intersymbol interference (ISI), which is an overlap of adjacently transmitted symbols. In a wireless network, ISI may be caused by reflections of the transmitted symbols off natural objects (e.g., tress, hills) and man-made objects (e.g., buildings, brides) in the environment. The reflections cause multiple time-delayed, partially overlapping copies (echoes) of the same signal to arrive at the receiver. ISI also may occur in a non-linear, bandwidth limited channel if the symbol transmission rate is comparable to or exceeds the channel bandwidth, W.

Receivers frequently use a well-known technique, adaptive decision-feedback equalization, to minimize the effects of ISI. An adaptive decision-feedback equalizer (DFE) consists of a feedforward (or forward) filter, a feedback filter, and a decision circuit that decides or detects the value of each symbol in the received signal. The input to the forward filter is the received distorted sequence of data symbols. The input to the feedback filter is the sequence of previously decided (detected) symbols at the output of the decision circuit. The feedback filter removes from the symbol presently being estimated that portion of the ISI that is caused by previously detected symbols.

There are limitations, however, to the performance of decision feedback equalizers. Even under the best of circumstances, a DFE occasionally makes an incorrect decision regarding the value of a received data symbol. The incorrect estimate is then propagated back to the feedback filter, thereby affecting decisions regarding subsequent symbols. Furthermore, a DFE almost always does not perform detection on the first copy of a symbol as it is received. Because of the performance of the channel, symbol reflections may combine in such a way that the peak power of the transmitted symbol occurs after the first echo of the symbol enters the DFE. Thus, some reflections of a symbol (postcursors) are received by the DFE after a symbol is detected, but other reflections of a symbol (precursors) are received by the DFE before the symbol is due to be detected. A conventional DFE is unable to compensate for precursor ISI in the detection of the present symbol because of the causal nature of the feedback filter.

For example, in a sequence of ten symbols, the DFE may be working on detecting (deciding) the fifth symbol. However, precursor ISI from the sixth and seventh symbols and post-cursor ISI of the third and fourth symbols may contribute to distortion of the fifth symbol. Since the third and fourth symbols have already been decided by the decision circuit, the feedback loop can be used to remove the postcursor ISI. However, since the sixth symbol has not been detected yet, the feedback filter does nothing to remove the precursor ISI.

There is therefore a need in the art for improved receivers and transmitters for use in communication networks. In particular, there is a need in the art for improved decision feedback equalizers that have a lower detected symbol error rate. More particularly, there is a need for receivers containing decision feedback equalizers (DFEs) that are capable of at least partially minimizing precursor ISI due to symbols that have not yet been detected. Moreover, there is a need for improved transmitters and data networks that are capable of maximizing the performance of receivers that contain decision feedback equalizers capable of reducing precursor ISI.

SUMMARY OF THE INVENTION

To address the above-discussed deficiencies of the prior art, it is a primary object of the present invention to provide an apparatus for reducing a precursor ISI signal for use in a receiver capable of receiving from a transmission channel an incoming stream of known symbols and unknown symbols distorted by intersymbol interference (ISI). In an advantageous embodiment of the present invention, the apparatus for reducing a precursor ISI signal, comprises: 1) a decision feedback equalizer capable of receiving the incoming stream of distorted known symbols and distorted unknown symbols and generating a sequence of detected symbols; and 2) a known symbol generator capable of generating a copy of a first known symbol prior to an estimation of the first known symbol by the decision feedback equalizer, wherein the decision feedback equalizer uses the copy of the first known symbol to reduce a first precursor ISI signal in a second symbol transmitted prior to the first known symbol.

According to one embodiment of the present invention, the decision feedback equalizer comprises a forward filter capable of receiving the incoming stream of distorted known symbols and distorted unknown symbols and generating an equalized output comprising a first estimated sequence of known symbols and unknown symbols.

According to another embodiment of the present invention, the decision feedback equalizer further comprises a first feedback filter capable of receiving the sequence of detected symbols and generating a first feedback signal capable of reducing in the second symbol a first postcursor ISI signal caused by a first detected symbol transmitted prior to transmission of the second symbol.

According to still another embodiment of the present invention, the decision feedback equalizer further comprises a first summation circuit capable of summing the equalized output from the forward filter and the first feedback signal from the first feedback filter to produce a combined output.

According to yet another embodiment of the present invention, the decision feedback equalizer further comprises a symbol estimator capable of quantizing the combined output from the first summation circuit to thereby generate the sequence of detected symbols.

According to a further embodiment of the present invention, the decision feedback equalizer further comprises a second feedback filter capable of receiving the first known symbol from the known symbol generator and generating a second feedback signal capable of reducing the first precursor ISI signal in the second symbol.

According to a still further embodiment of the present invention, the decision feedback equalizer further comprises a second summation circuit capable of summing the first feedback signal and the second feedback signal.

According to a yet another embodiment of the present invention, the transmission channel is one of a wireline channel and a wireless channel.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged receiver.

Many wireline and wireless communication systems transmit a known sequence of symbols, called a training sequence, along with the unknown sequence of user data symbols in order to synchronize and adjust the receiver. The timing and values of the symbols in the training sequence are known by the receiver, thereby making the training sequence relatively easy to detect. An adaptive algorithm controller in the receiver analyzes the received training sequence, compares it to the known sequence, and uses the statistical properties of the received signal to adjust the values of the weighting coefficients in the forward filter and feedback filter of the DFE. When the unknown symbols are received, the DFE is better able to detect the correct values of the user data symbols. The present invention takes advantage of the transmission of known symbols to provide an improved receiver that at least partially reduces precursor ISI. Furthermore, the present invention also provides an improved transmitter that transmits the known symbols in an optimum manner to take advantage of the ability of the receiver to reduce the precursor ISI.

Figure 1A:
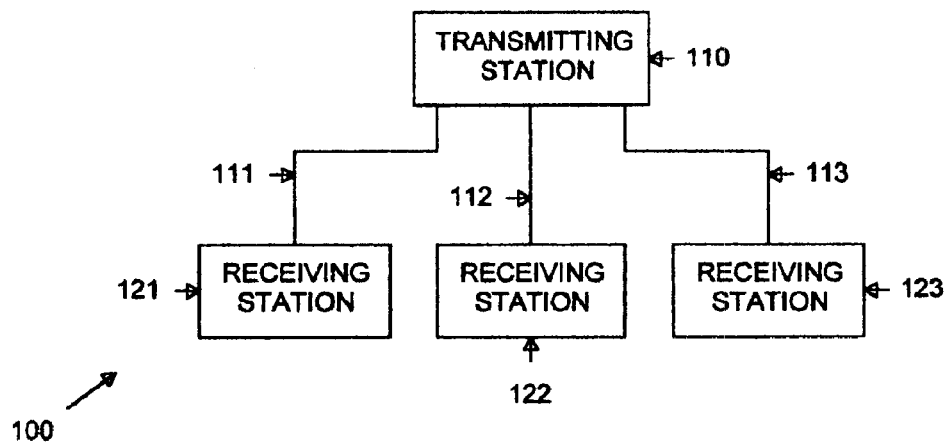
FIG. 1A illustrates an exemplary wireline network according to one embodiment of the present invention.

FIG. 1A illustrates exemplary wireline network 100 according to one embodiment of the present invention.

Wireline network 100 comprises transmitting station 110 and receiving stations 121, 122 and 123. Transmitting station 110 communicates with receiving station 121–123 via wirelines 111, 112 and 113. The words "transmitting" and "receiving" with respect to transmitting station 110 and receiving stations 121–123 are exemplary only and should not be construed to limit the scope of the invention to one-way communication. In fact, in advantageous embodiments of the present invention, transmitting station 110 may comprise transceiver circuitry capable of transmitting data to, and receiving data from, receiving stations 121–123. Accordingly, in such embodiments, receiving station 121–123 also may comprise transceiver circuitry capable of transmitting data to, and receiving data from, transmitting station 110. Both transmitting station 110 and each of receiving stations 121–123 transmit data to a receiving device as mixture of known symbol sequences (e.g., training sequences) and unknown symbols (i.e., user data).

By way of example, in one embodiment of the present invention, transmitting station 110 may comprise a server in a local area network (LAN) or wide area network (WAN) that communicates bidirectionally with client nodes (i.e., receiving stations 121–123). In an alternate embodiment of the present invention, transmitting station 110 may comprise a cable television broadcast system that primarily transmit video signals to cable set-top boxes (i.e., receiving stations 121–123) in subscriber homes. However, transmitting station 110 may also receive upstream data traffic transmitted by the cable set-top boxes (STBs).

Figure 1B:
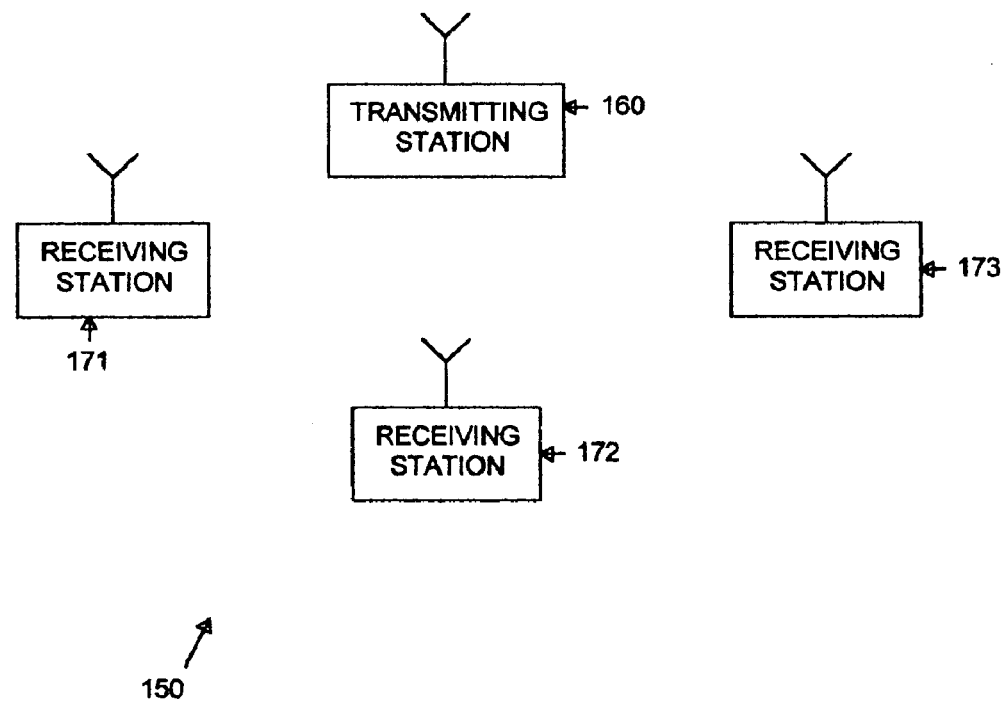
FIG. 1B illustrates an exemplary wireless network according to one embodiment of the present invention.

FIG. 1B illustrates exemplary wireless network 150 according to one embodiment of the present invention. Wireless network 150 comprises transmitting station 160 and receiving stations 171, 172 and 173. Transmitting station 160 communicates via the air interface with receiving station 171–173. Again, the words "transmitting" and "receiving" with respect to transmitting station 160 and receiving stations 171–173 are exemplary only and should not be construed to limit the scope of the invention to one-way wireless communication. In fact, in advantageous embodiments of the present invention, transmitting station 160 may comprise transceiver circuitry capable of wirelessly transmitting data to, and wirelessly receiving data from, receiving stations 171–173. Accordingly, in such embodiments, receiving station 171–173 also may comprise transceiver circuitry capable of wirelessly transmitting data to, and wirelessly receiving data from, transmitting station 160. Both transmitting station 160 and each of receiving stations 171–173 transmit data to a receiving device as mixture of known symbol sequences (e.g., training sequences) and unknown symbols (i.e., user data).

By way of example, in one embodiment of the present invention, O transmitting station 160 may comprise a server in a wireless LAN or WAN that communicates bidirectionally with client nodes (i.e., receiving stations 171–173). In an alternate embodiment of the present invention, transmitting station 160 may comprise a base transceiver station in a cellular network that transmits voice and data traffic to mobile stations (i.e., receiving stations 171–173) and receive voice and data traffic from the mobile stations (e.g., cell phones). In still another embodiment of the present invention, transmitting station 160 may comprise a high definition television (HDTV) broadcast facility that transmits high definition video signals to HDTV receivers (i.e., receiving stations 171–173) in its local coverage area.

In both wireline network 100 and wireless network 150, each transmitted data symbol arrives at the receiving device distorted by postcursor and precursor intersymbol interference (ISI) caused by the band-width limited transmission channel and or reflections off objects. To minimize the effects of ISI, receiving stations 121–123 and receiving stations 171–173 comprise adaptive decision feedback equalizers (DFEs) capable of reducing both postcursor ISI and precursor ISI in accordance with the principles of the present invention. Furthermore, in bidirectional communication networks, transmitting stations 110 and 160 also may comprise adaptive DFEs capable of reducing both postcursor ISI and precursor ISI in signals transmitted by receiving stations 121–123 and receiving stations 171–173.

Figure 2:
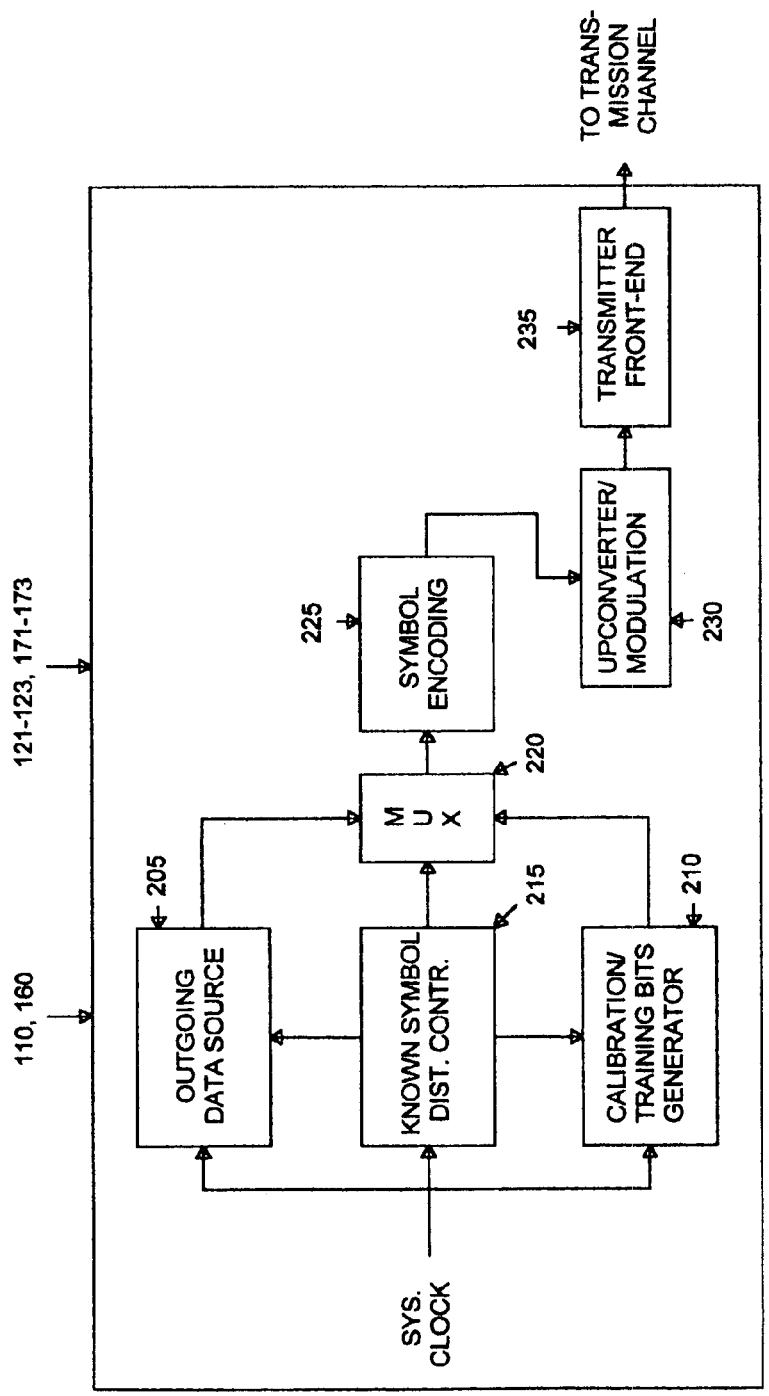
FIG. 2 illustrates selected portions of exemplary transmitter circuitry disposed in the transmitting stations and, for two-way systems, the receiving stations in FIGS. 1A and 1B.

FIG. 2 illustrates selected portions of exemplary transmitter circuitry disposed in transmitting stations 110 and 160 and, for two-way systems, receiving stations 121–123 and 171–173. The exemplary transmitter circuitry comprises outgoing data source 205, calibration/training bits generator 210, known symbol distribution controller 215, multiplexer 220, symbol encoding circuitry 225, up-converter/modulation circuitry 230, and transmitter front-end circuitry 235. Outgoing data source 205 generates the user data that is to be transmitted to a receiving device. For example, outgoing data source 205 may be a cell phone vocoder that converts an analog voice signal to digital data to be transmitted to a base transceiver station. Alternatively, outgoing data source 205 may be an application executed on a server that transmits data to a client work station via a wireline LAN.

The user data generated by outgoing data source 205 are unknown data bits that are combined with known data bits generated by calibration/training bits generator 210. Calibration/training bits generator 210 may generated a training sequence that precedes the unknown user data. Calibration/training bits generator 210 also may generate additional training sequences that are distributed among the unknown data as a single block or in a plurality of smaller blocks at known intervals or locations among the unknown user data. For example, in a GSM mobile phone network, a GSM data packet comprises 148 bits, including 116 user data bits. The GSM data packet also comprises 3 start bits at the start of the user data, a 26-bit training sequence in the middle of the user data bits, and 3 stop bits at the end of the user data bits.

The size and location of the training/calibration sequences of known data bits are controlled by known symbol distribution controller 215, which selectively switches the source of data that is output by multiplexer (MUX) 220. Thus, the output of MUX 220 is a stream of known calibration/training bits interspersed at known locations among unknown user data bits. In an advantageous embodiment of the present invention, known symbol distribution controller 215 is an adaptive device that is capable of modifying the size and location of groups of calibration/training bits according to the known characteristics of the receiver. More particularly, known symbol distribution controller 215 is capable of modifying the size and location of groups of calibration/training bits in order to maximize the performance of the improved precursor ISI cancellation decision feedback equalizer (DFE) in the receiving device.

Symbol encoding circuitry 225 encodes the data bits according to any known symbol encoding scheme. Thus, a Logic 1 bit received from multiplexer 225 may be encoded as a first unique sequence of pulses and a Logic 0 bit received from multiplexer 225 may be encoded as a second unique sequence of pulses. Thus, the output of symbol encoding circuitry 225 is the sequence of known and unknown symbols that must be detected by the receiver DFE.

Up-converter/modulation circuitry 230 converts the baseband sequence of known and unknown symbols to a modulated (up-converted) signal capable of being transmitted through the transmission channel (wireline or wireless). For example, in a wireless network, up-converter/modulation circuitry 230 may comprise an RF mixer that converts the baseband sequence to a modulated radio frequency (RF) signal capable of being transmitted through the air channel to a receiving device. Finally, transmitter front-end circuitry comprises RF amplifiers, duplexer circuitry, and antennas that transmit the output of up-converter/modulation circuitry 230 into the corresponding wireline or wireless channel.

The arrangement and interconnection of known symbol distribution controller 215, calibration/training bits generator 210, and symbol encoding circuitry 225 is exemplary only. Those skilled in the art will recognize there are numerous other circuit arrangements capable of inserting known symbols at known locations in a sequence of outgoing unknown symbols. The arrangement in FIG. 2 is suitable for those applications in which a symbol is used to represent no more than one data bit. This ensures that a known bit from calibration/training bits generator 210 is encoded only as a known symbol and that an unknown bit from outgoing data source 205 is encoded only as an unknown symbol.

However, in other systems, a single symbol may be used to represent more than one data bit. For example, four different symbols may be used to represent the bit pairs 00, 01, 10, 11. In such a system, precautions must be taken to ensure that symbol encoding circuitry 225 does not encode a known bit and an unknown data bit as a single symbol. To accomplish this, known symbol distribution controller 215 and calibration/training bits generator 210 may be coupled directly to symbol encoding circuitry 225, and multiplexer 220 may be omitted. In such a circuit arrangement, symbol encoding circuitry 225 would encode all unknown data bit pairs from outgoing data source 205 as a sequence of unknown symbols and known symbol distribution controller 215 would cause symbol encoding circuitry 225 to insert known symbols representing known data bit pairs into the outgoing sequence of unknown symbols.

Figure 3:
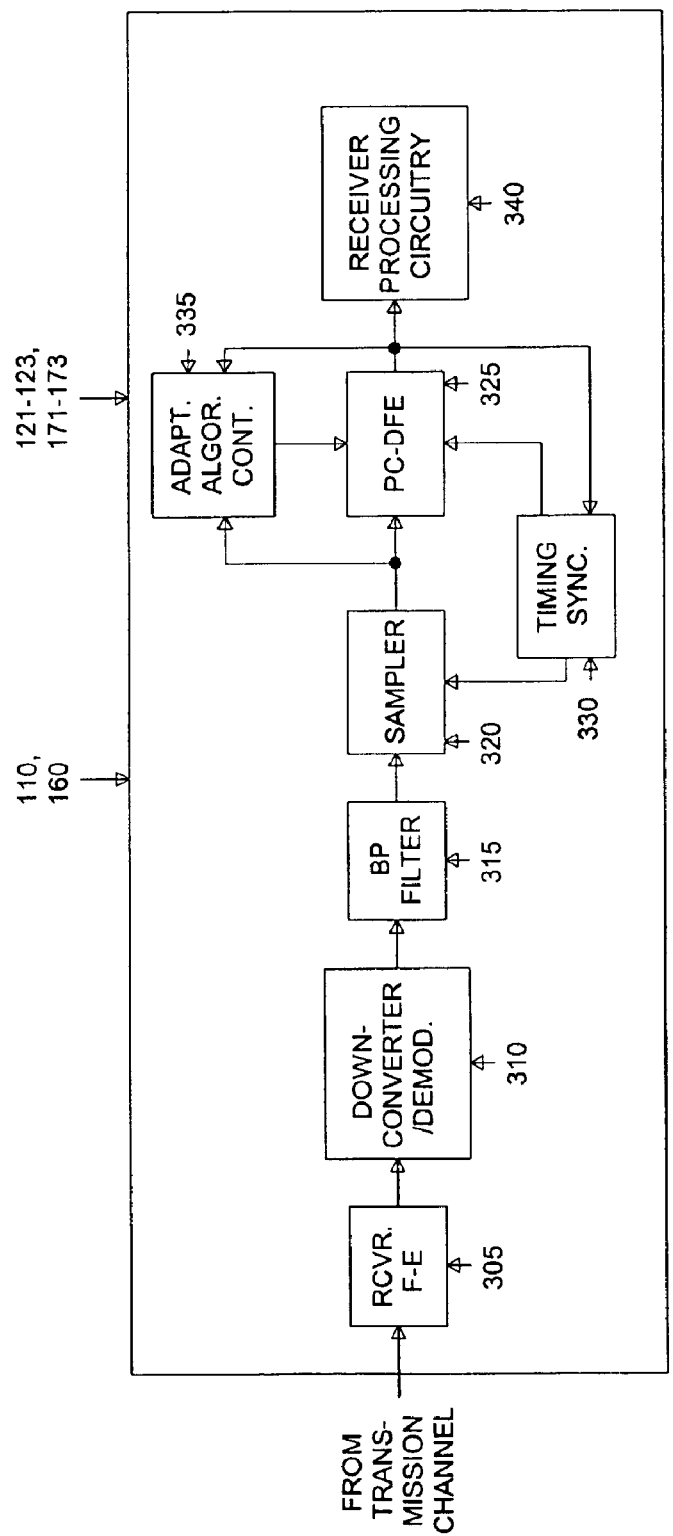
FIG. 3 illustrates selected portions of exemplary receiver circuitry disposed in the receiving stations and, for two-way systems, the transmitting stations in FIGS. 1A and 1B.

FIG. 3 illustrates selected portions of exemplary receiver circuitry disposed in receiving stations 121–123 and 171–173 and, for two-way systems, transmitting stations 110 and 160. The exemplary receiver circuitry comprises receiver front-end (F-E) circuitry 305, down-converter/demodulation circuitry 310, bandpass (BP) filter 315, sampler circuitry 320, precursor decision feedback equalizer (PC-DFE) 325, timing synchronization circuitry 330, adaptive algorithm controller 335, and receiver processing circuitry 340. Receiver front-end circuitry 305 typically comprises a low noise amplifier and filters that receive the transmitted known and unknown symbols from the wireline or wireless channels and amplify and isolate the frequencies of interest (i.e., receive band).

Down-converter/demodulation circuitry 310 demodulates (down-converts) the incoming modulated signals to produce an analog baseband signal comprising a sequence of known and unknown symbols that are distorted to postcursor and precursor ISI. Sampler circuitry 320 converts the analog baseband signal to a digital baseband signal. The digital baseband signal is filtered by PC-DFE 325 to minimize the postcursor and precursor ISI distortion. Ideally, the output of PC-DFE 325 is the original sequence of known and unknown symbols.

Timing synchronization circuit 330 receives the output of PC-DFE 325 and uses it to synchronize (align) the analog-to-digital converter in sampler circuitry 320 and to synchronize the filtering circuitry in PC-DFE 325, as described below in greater detail. Adaptive algorithm controller 335 also receives the output of PC-DFE 325 and compares it to the input sequence of distorted symbols from sampler circuitry 320. From this comparison, adaptive algorithm controller 335 can determine and modify the weighting coefficients in the forward filter section and the feedback filter section of PC-DFE 325 in order to minimize ISI distortion. Finally, receiver processing circuitry 340 converts the sequence of known (i.e., calibrations/training) symbols and unknown symbols back to data bits and extracts the user data bits according to the algorithm used by known symbol distribution controller 215.

Figure 4:
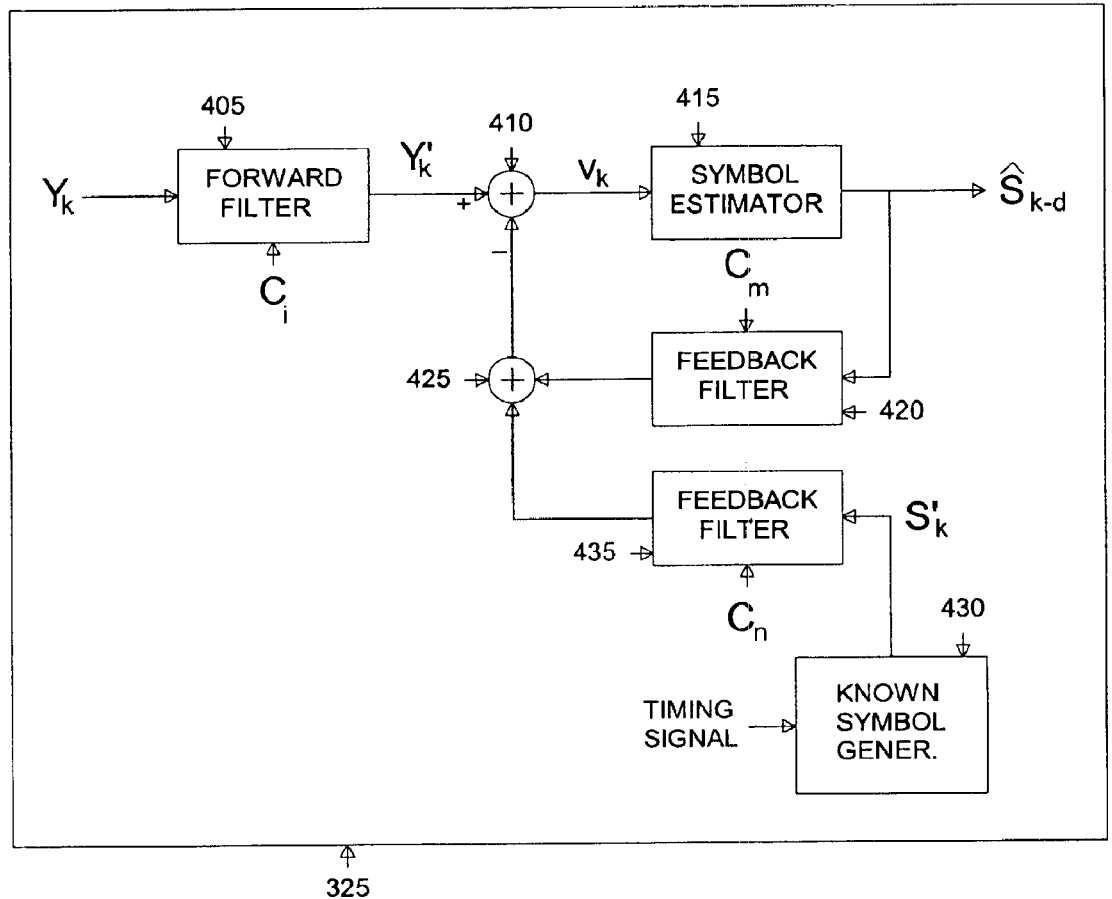
FIG. 4 illustrates an exemplary precursor cancellation decision feedback equalizer in a receiver according to one embodiment of the present invention.

FIG. 4 illustrates exemplary precursor cancellation decision feedback filter (PC-DFE) 325 in greater detail according to one embodiment of the present invention. PC-DFE 325 comprises forward filter 405, summer 410, symbol estimator 415, feedback filter 420, summer 425, feedback filter 435 and known symbol generator 430 according to one embodiment of the present invention. Those skilled in the art will recognize that forward filter 405, summer 410, symbol estimator 415, and feedback filter 420 constitute a conventional decision feedback filter capable of reducing postcursor ISI from previously estimated (or decided) symbols. The present invention differs from a conventional decision feedback filter due to the addition of summer 425, feedback filter 435, and known symbol generator 430.

As noted above, adaptive algorithm controller 335 determines the values of the weighting coefficients, Ci, of forward filter 405, the weighting coefficients, Cm, of feedback filter 420, and the weighting coefficients, Cn, of feedback filter 435. Adaptive algorithm controller 335 estimates the channel impulse response during receipt of the known training symbols and during receipt of other known symbols, such as known synchronization symbols and known packet identification symbols. If a training sequence is used, forward filter 405, feedback filter 420 and feedback filter 435 may be adaptively adjusted using the recursive least square (RLS) algorithm or the least mean square (LMS) algorithm.

Forward filter 405 receives the sequence of ISI-distorted symbols, $Y_k$, from sampler circuit 320 and produces an equalized output, $Y'_k$, that is an estimate of the input sequence. Adder 410 add the $Y'_k$ output to a composite (precursor and postcursor) ISI correction signal (explained below in greater detail) from summer 425 to produce the symbol estimate, $V_k$. Symbol estimator 415 quantizes the $V_k$ symbol estimate to the nearest symbol value to form a sequence of decided (i.e., detected) symbols, $\hat{S}_{k-d}$, that is transmitted to timing synchronization circuitry 330, adaptive algorithm controller 335, and receiver processing circuitry 340. The quantity k is the index of the current symbol and d is the decision (detection) delay associated with symbol estimator 415. The decided symbol sequence also is transmitted back to feedback filter 420, which removes that part of the intersymbol interference from the present estimate caused by previously detected symbols (i.e., post-cursor ISI).

Known symbol generator 430 receives a timing signal from timing synchronization circuitry 330 and transmits a sequence of known symbols, $S'_k$, through feedback filter 435 at the proper location in the sequence of known and unknown symbols that are being processed by symbol estimator 415. In an advantageous embodiment of the present invention, feedback filter 435 is a $L_2$-tap transversal filter chosen to minimize precursor ISI from the known symbols. The output of known symbol generator 430 is normally zero. However, known symbol generator 430 generates known symbols during the time periods when one or more preceding unknown symbols are being estimated by symbol estimator 415. In this manner, the effect of the precursor ISI of the known symbol can be removed from the present estimate, even though the known symbol has not been detected yet.

For example, if the sixth symbol in a sequence is known, known symbol generator 430 can output the sixth symbol during the estimation of the unknown fourth symbol and the unknown fifth symbol. The precursor ISI of the sixth symbol can therefore be removed from, for example, the fifth symbol estimate, just as feedback filter 420 removes from the fifth symbol estimate the postcursor ISI of the fourth symbol.

Figure 5:
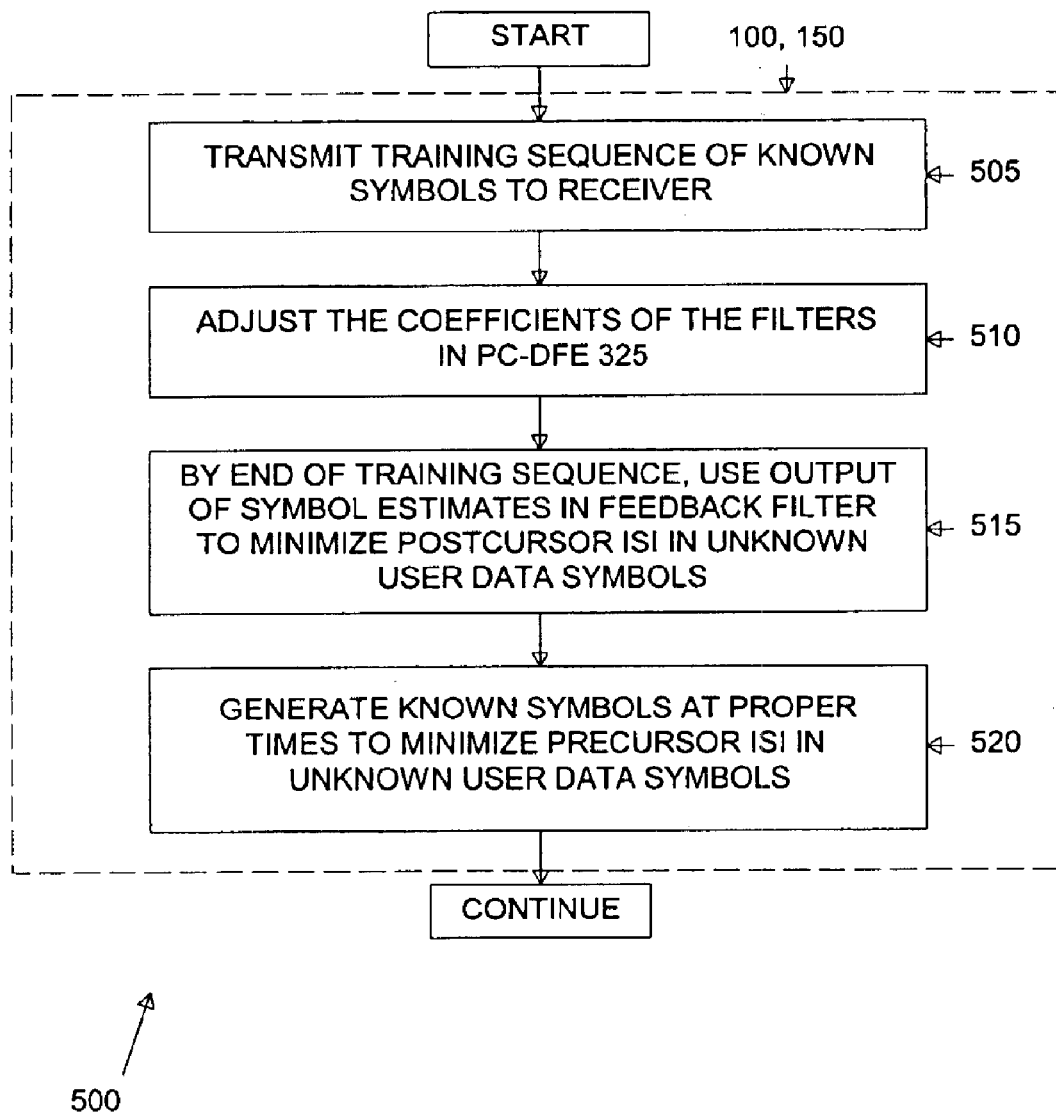
FIG. 5 is a flow diagram illustrating the operation of the transmitters and receivers in the exemplary wireline and wireless networks according to one embodiment of the present invention.

FIG. 5 depicts flow diagram 500, which illustrates the operation of exemplary transmitting stations 110 and 150 and exemplary receiving stations 121–123 and 171–173 in wireline network 100 and wireless network 150 according to one embodiment of the present invention. Transmission of user data begins when, for example, transmitting station 110 transmits a training sequence of known symbols to receiving station 121 (process step 505). Next, adaptive algorithm controller 335 in receiving station 121 adjusts the coefficients of the filters in PC-DFE 325 to achieve, for example, minimum mean square error (process step 510). By the end of the training sequence, PC-DFE 325 uses the output of symbol estimator 415 in feedback filter 420 to minimize postcursor ISI in subsequent unknown user data symbols (process step 515). At the same time, PC-DFE 325 uses the output of known symbol generator 430 in feedback filter 435 to minimize precursor ISI in subsequent unknown user data symbols (process step 520).

Although the present invention has been described in detail, those skilled in the art should understand that they can make various changes, substitutions and alterations herein without departing from the spirit and scope of the invention in its broadest form.

What is claimed is:

1. For use in a receiver capable of receiving from a transmission channel an incoming stream of known symbols and unknown symbols distorted by intersymbol interference (ISI), an apparatus for reducing a precursor ISI signal comprising:
a decision feedback equalizer capable of receiving said incoming stream of distorted known symbols and distorted unknown symbols and generating a sequence of detected symbols; and
a known symbol generator capable of generating a copy of a first known symbol prior to an estimation of said first known symbol by said decision feedback equalizer, wherein said decision feedback equalizer uses said copy of said first known symbol to reduce a first precursor ISI signal in a second symbol transmitted prior to said first known symbol.

2. The apparatus as set forth in claim 1 wherein said decision feedback equalizer comprises a forward filter capable of receiving said incoming stream of distorted known symbols and distorted unknown symbols and generating an equalized output comprising a first estimated sequence of known symbols and unknown symbols.

3. The apparatus as set forth in claim 2 wherein said decision feedback equalizer further comprises a first feedback filter capable of receiving said sequence of detected symbols and generating a first feedback signal capable of reducing in said second symbol a first postcursor ISI signal caused by a first detected symbol transmitted prior to transmission of said second symbol.

4. The apparatus as set forth in claim 3 wherein said decision feedback equalizer further comprises a first summation circuit capable of summing said equalized output from said forward filter and said first feedback signal from said first feedback filter to produce a combined output.

5. The apparatus as set forth in claim 4 wherein said decision feedback equalizer further comprises a symbol estimator capable of quantizing said combined output from said first summation circuit to thereby generate said sequence of detected symbols.

6. The apparatus as set forth in claim 5 wherein said decision feedback equalizer further comprises a second feedback filter capable of receiving said first known symbol from said known symbol generator and generating a second feedback signal capable of reducing said first precursor ISI signal in said second symbol.

7. The apparatus as set forth in claim 6 wherein said decision feedback equalizer further comprises a second summation circuit capable of summing said first feedback signal and said second feedback signal.

8. The apparatus as set forth in claim 1 wherein said transmission channel is one of a wireline channel and a wireless channel.

9. A receiver capable of minimizing precursor intersymbol interference (ISI) in an incoming stream of known symbols and unknown symbols distorted by intersymbol interference (ISI) in a transmission channel, said receiver comprising:
receiver front-end circuitry capable of receiving and amplifying an incoming modulated signal;
demodulation circuitry capable of receiving said amplified incoming modulated signal and producing therefrom a baseband signal comprising said incoming stream of distorted known symbols and distorted unknown symbols; and
an apparatus for reducing a precursor ISI signal comprising:
a decision feedback equalizer capable of receiving said incoming stream of distorted known symbols and distorted unknown symbols and generating a sequence of detected symbols; and
a known symbol generator capable of generating a copy of a first known symbol prior to an estimation of said first known symbol by said decision feedback equalizer, wherein said decision feedback equalizer uses said copy of said first known symbol to reduce a first precursor ISI signal in a second symbol transmitted prior to said first known symbol.

10. The receiver as set forth in claim 9 wherein said decision feedback equalizer comprises a forward filter capable of receiving said incoming stream of distorted known symbols and distorted unknown symbols and generating an equalized output comprising a first estimated sequence of known symbols and unknown symbols.

11. The receiver as set forth in claim 10 wherein said decision feedback equalizer further comprises a first feedback filter capable of receiving said sequence of detected symbols and generating a first feedback signal capable of reducing in said second symbol a first postcursor ISI signal caused by a first detected symbol transmitted prior to transmission of said second symbol.

12. The receiver as set forth in claim 11 wherein said decision feedback equalizer further comprises a first summation circuit capable of summing said equalized output from said forward filter and said first feedback signal from said first feedback filter to produce a combined output.

13. The receiver as set forth in claim 12 wherein said decision feedback equalizer further comprises a symbol estimator capable of quantizing said combined output from said first summation circuit to thereby generate said sequence of detected symbols.

14. The receiver as set forth in claim 13 wherein said decision feedback equalizer further comprises a second feedback filter capable of receiving said first known symbol from said known symbol generator and generating a second feedback signal capable of reducing said first precursor ISI signal in said second symbol.

15. The receiver as set forth in claim 14 wherein said decision feedback equalizer further comprises a second summation circuit capable of summing said first feedback signal and said second feedback signal.

16. The receiver as set forth in claim 9 wherein said transmission channel is one of a wireline channel and a wireless channel.

17. For use in a receiver capable of receiving from a transmission channel an incoming stream of known symbols and unknown symbols distorted by intersymbol interference (ISI), a method of reducing a precursor ISI signal comprising the steps of:

receiving the incoming stream of distorted known symbols and distorted unknown symbols;

generating a sequence of detected symbols in a decision feedback equalizer;

generating a copy of a first known symbol prior to an estimation of the first known symbol by the decision feedback equalizer; and using the copy of the first known symbol to reduce a first precursor ISI signal in a second symbol transmitted prior to the first known symbol.

18. The method as set forth in claim 17 wherein the decision feedback equalizer comprises a forward filter capable of receiving the incoming stream of distorted known symbols and distorted unknown symbols and generating an equalized output comprising a first estimated sequence of known symbols and unknown symbols.

19. The method as set forth in claim 18 wherein the decision feedback equalizer further comprises a first feedback filter capable of receiving the sequence of detected symbols and generating a first feedback signal capable of reducing in the second symbol a first postcursor ISI signal caused by a first detected symbol transmitted prior to transmission of the second symbol.

20. The method as set forth in claim 19 wherein the decision feedback equalizer further comprises a first summation circuit capable of summing the equalized output from the forward filter and the first feedback signal from the first feedback filter to produce a combined output.

21. The method as set forth in claim 20 wherein the decision feedback equalizer further comprises a symbol estimator capable of quantizing the combined output from the first summation circuit to thereby generate the sequence of detected symbols.

22. The method as set forth in claim 21 wherein the decision feedback equalizer further comprises a second feedback filter capable of receiving the first known symbol from the known symbol generator and generating a second feedback signal capable of reducing the first precursor ISI signal in the second symbol.

23. The method as set forth in claim 22 wherein the decision feedback equalizer further comprises a second summation circuit capable of summing the first feedback signal and the second feedback signal.

* * * * *